United States Patent
Yang et al.

(10) Patent No.: US 12,462,584 B2
(45) Date of Patent: Nov. 4, 2025

(54) LANE LINE LABELING METHOD, ELECTRONIC DEVICE AND STORAGE MEDIUM

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 366 days.

(21) Appl. No.: 18/123,875

(22) Filed: Mar. 20, 2023

(65) Prior Publication Data
US 2024/0221390 A1     Jul. 4, 2024

(30) Foreign Application Priority Data

Dec. 30, 2022   (CN) ......................... 202211735028.0

(51) Int. Cl.
*G06V 20/56*     (2022.01)
*G06T 7/73*      (2017.01)
*G06V 20/70*     (2022.01)

(52) U.S. Cl.
CPC .............. *G06V 20/588* (2022.01); *G06T 7/73* (2017.01); *G06V 20/70* (2022.01); *G06T 2207/30241* (2013.01); *G06T 2207/30244* (2013.01); *G06T 2207/30256* (2013.01)

(58) Field of Classification Search
CPC ........ G06V 20/588; G06V 20/70; G06T 7/73; G06T 2207/30241; G06T 2207/30244; G06T 2207/30256; G06T 7/70; G06T 17/00; G06T 2207/10004; G01S 19/47; G01S 19/393; G01C 21/165
USPC ......................................... 382/104
See application file for complete search history.

(56) References Cited

U.S. PATENT DOCUMENTS

| | | | | |
|---|---|---|---|---|
| 11,696,034 | B1 * | 7/2023 | Hutz | H04N 7/188 |
| | | | | 348/169 |
| 12,300,000 | B2 * | 5/2025 | Fowe | G06T 7/20 |

FOREIGN PATENT DOCUMENTS

| | | | | |
|---|---|---|---|---|
| CN | 105787455 | * | 7/2016 | |
| CN | 113705305 | * | 11/2021 | G06F 18/23 |
| CN | 114627409 | * | 6/2022 | |
| CN | 115493614 | * | 12/2022 | G01C 21/365 |
| EP | 2612111 | * | 3/2017 | G01C 21/16 |

* cited by examiner

*Primary Examiner* — Jerome Grant, II
(74) *Attorney, Agent, or Firm* — ScienBiziP, P.C.

(57) ABSTRACT

A lane line labeling method applied to an electronic device is provided. In the method, the electronic device acquires a target image corresponding to a target lane. Motion trajectory points of a target vehicle driving on the target lane are obtained. The electronic device determines projected pixel coordinates of the motion trajectory points on the target image, and determines target pixel coordinates corresponding to target lane lines on the target lane based on the projected pixel coordinates. Once target camera coordinates corresponding to the target pixel coordinates are obtained, the electronic device labels the target lane lines according to the target camera coordinates.

17 Claims, 3 Drawing Sheets

LANE LINE LABELING METHOD, ELECTRONIC DEVICE AND STORAGE MEDIUM

FIELD

The present disclosure relates to the field of intelligent driving technology, in particular to a lane line labeling method, an electronic device, and a storage medium.

BACKGROUND

As a main feature of structured roads, lane lines have a strong guiding effect on normal driving and automatic driving. The lane line can guide a vehicle to drive in a correct area, provide a basis for an automatic cruise, a lane keeping, a lane overtaking and other behaviors of an automatic driving vehicle, and provide a driver with an early warning when the vehicle deviates from a lane, which is critical in maintaining a safe driving. Since vehicles do not always drive on flat roads, traditional two-dimensional lane lines perform poorly in tracking planning and control tasks for the automatic driving. Therefore, it is necessary to obtain a layout of 3D lane lines, which can realize effective and safe driving. Obtaining 3D lane lines is an important topic in the art of automatic driving.

In practical applications, it is very difficult and time-consuming to use manual labeling to obtain data of 3D lane lines, and an efficiency of labeling 3D lane lines is very low.

DETAILED DESCRIPTION

In order to more clearly understand the above objects, features and advantages of the present disclosure, the present disclosure will be described in detail below in conjunction with the accompanying drawings and specific embodiments. In the case of no conflict, the embodiments of the present disclosure and the features in the embodiments can be combined with each other.

Many specific details are set forth in the following description to facilitate a full understanding of the present disclosure, and the described embodiments are only some of the embodiments of the present disclosure, rather than all of them. Based on the embodiments in the present disclosure, all other embodiments obtained by persons of ordinary skill in the art without making creative efforts fall within the protection scope of the present disclosure.

Unless otherwise defined, all technical and scientific terms used herein have the same meaning as commonly understood by one of ordinary skill in the art to which this disclosure belongs. The terminology used herein in the description of the present disclosure is only for the purpose of describing specific embodiments, and is not intended to limit the present disclosure.

Hereinafter, the terms "first" and "second" are used for descriptive purposes only, and cannot be understood as indicating or implying relative importance or implicitly specifying the quantity of indicated technical features. Thus, a feature defined as "first" and "second" may explicitly or implicitly include one or more of these features. In the description of the embodiments of the present disclosure, words such as "exemplary", "or", and "for example" are used as examples, or illustrations. Any embodiment or design described as "exemplary" or "for example" in the embodiments of the present disclosure shall not be construed as being more preferred or more advantageous than other embodiments or designs. Rather, the use of words such as "exemplary", "or", "for example" and the like are intended to present related concepts in a concrete manner.

Unless defined, otherwise, all technical and scientific terms used herein have the same meaning as commonly understood by one of ordinary skill in the art to which this disclosure belongs. The terms used in the description of the present disclosure are only for the purpose of describing specific embodiments, and are not intended to limit the present disclosure. It should be understood that unless otherwise specified in the present disclosure, "/" means or. For example, A/B can mean either A or B. The "and/or" in this disclosure is only an association relationship describing associated objects, which means that there may be three relationships. For example, A and/or B may mean: A exists alone, A and B exist simultaneously, and B exists alone. "At least one" means one or more. "A plurality" means two or more than two. For example, at least one of a, b or c can represent: a, b, c, a and b, a and c, b and c, a, b and c seven situations. It should be understood that the order of blocks shown in the flowcharts herein may be changed, and some may be omitted.

As a main feature of structured roads, lane lines have a strong guiding effect on normal driving and automatic driving. Lane lines refer to lane markings, including but not limited to white dotted lines, white solid lines, yellow dotted lines, and yellow solid lines. The lane lines can guide a vehicle to drive in a correct area, provide a basis for an automatic cruise, a lane keeping, a lane overtaking and other behaviors of a self-driving vehicle, and provide a driver with an early warning when the vehicle deviates from a lane, which is helpful for the vehicle to keep in a safe driving. For example, during a driving process of the vehicle, a vehicle system that is in a smart mode can control or assist the driving of the vehicle based on the lane lines and activated functions. Since vehicles do not always drive on flat roads, traditional two-dimensional lane lines perform poorly in tracking planning and control tasks for the automatic driving, for example, an inability to accurately control a speed of automatic driving. For example, a vehicle traveling downhill is slower than on a flat road. Therefore, it is necessary to obtain a layout of 3D lane lines, which can realize effective and safe driving. How to obtain 3D lane lines is an important part of the automatic driving.

In order to improve the efficiency of labeling three-dimensional lane lines, the embodiments of the present disclosure provide a lane line labeling method, an electronic device, and a computer-readable storage medium.

In order to make the purpose, technical solution and advantages of the lane line labeling method provided by the embodiments of the present disclosure clearer, the lane line labeling method will be described in detail below with reference to the drawings and specific embodiments.

Figure 1:
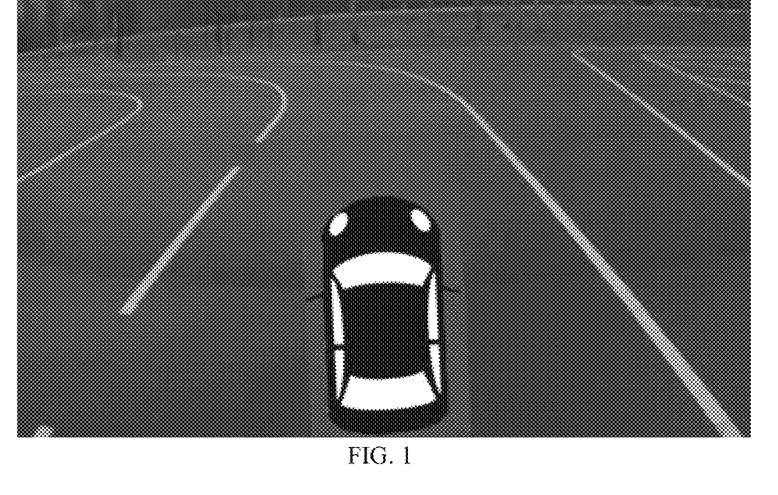
FIG. 1 is a schematic diagram of a scenario of using a lane line labeling method provided by an embodiment of the present disclosure.

FIG. 1 is a schematic diagram of a usage scenario of a lane line labeling method provided by an embodiment of the present disclosure. As shown in FIG. 1, a target vehicle is driving on a target lane. A target image corresponding to the target lane and a motion trajectory of the target vehicle when the target vehicle drives on the target lane are acquired, and motion trajectory points corresponding to the motion trajectory are obtained. Among them, continuous motion trajectory points constitute the motion trajectory. The target image is obtained by photographing the lanes formed by the lane lines, and the target image includes the lane lines. Projected pixel coordinates of the motion trajectory points on the target image are calculated; and based on the projected pixel coordinates, target pixel coordinates corresponding to the target lane line on the target lane are determined; target camera coordinates corresponding to the target pixel coordinates are calculated, and the target lane lines are finally marked according to the target camera coordinates. For some specific implementations of the lane line labeling method, please refer to the relevant description below. The lane line labeling method provided in the embodiments of the present disclosure can improve the efficiency of labeling three-dimensional lane lines.

The lane line labeling method in the embodiments of the present disclosure can be applied to electronic device, which can be a vehicle-mounted device, such as a lane line labeling device, a mobile phone, a tablet computer, a desktop computer, a laptop computer, a handheld computer, a notebook computer, Ultra-mobile personal computers (UMPCs), netbooks, as well as cellular phones, personal digital assistants (PDA s), artificial intelligence (AI) devices, wearables, smart home devices and/or smart city equipment, such as smart driving platforms, and other electronic device. The embodiment of the present disclosure does not specifically limit the specific form of the electronic device. The network where the electronic device is located includes, but is not limited to, the Internet, a wide area network, a metropolitan area network, a local area network, a virtual private network (VPN) and the like. Wherein, the lane line labeling device can be mounted on a mobile device, and the lane line labeling device has a data connection with the mobile device. Wherein, the mobile device may be some mobile devices capable of driving on public transportation roads, such as self-driving vehicles. The lane line labeling device can also be a driving assistance device having a data connection with the mobile device. The lane line labeling device can be built into the mobile device, such as a system in which the lane line labeling device is integrated into the mobile device, etc., or can be externally connected to the mobile device, such as an auxiliary driving device connected to the outside of the mobile device. An intelligent driving platform can collect various types of road surface, road conditions and other information, and identify and mark the collected information, such as marking the collected lane lines, so as to use the labeled lane lines to provide route planning, map navigation and other functions for different vehicles. Specifically, in connection with this case, the intelligent driving platform can carry out three-dimensional marking on the lane lines in various lanes, so as to obtain the three-dimensional lane lines for the correct route planning of the vehicle and improve driving safety.

Figure 2:
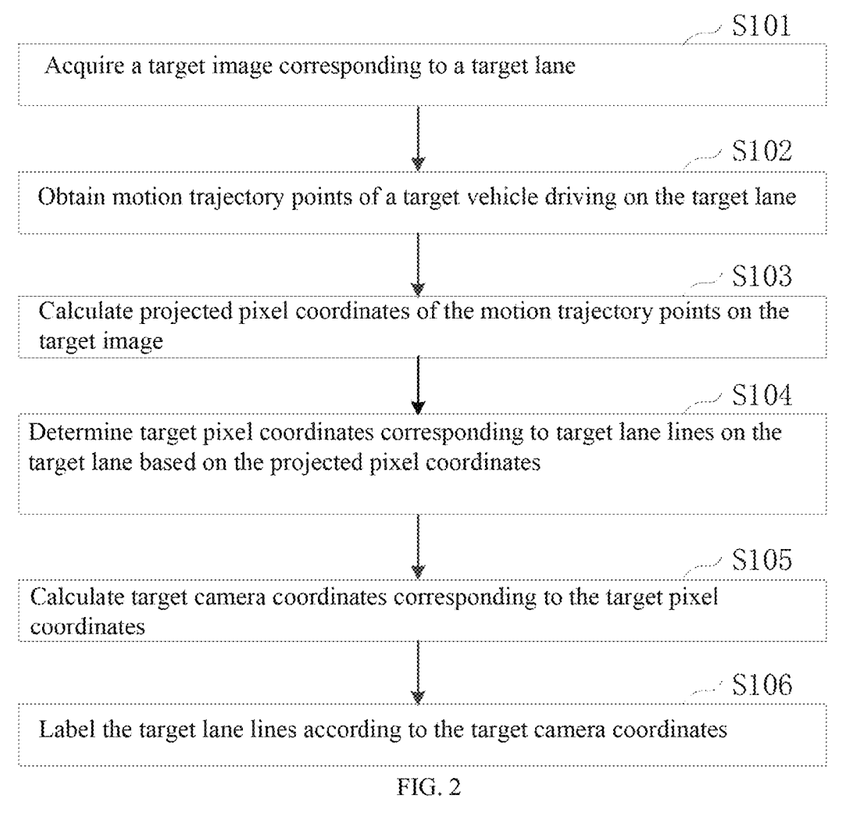
FIG. 2 is a schematic diagram of a flowchart of the lane line labeling method provided by an embodiment of the present invention.

Please refer to FIG. 2, FIG. 2 is a schematic diagram of a flowchart of a lane line labeling method provided by an embodiment of the present disclosure.

As shown in FIG. 1, the lane line labeling method includes blocks S101 to S107.

S101, the electronic device acquires a target image corresponding to a target lane.

A lane generally includes a plurality of lane lines. The target image includes at least two lane lines.

In some embodiments of the present disclosure, one or more sensors are further arranged on the target vehicle for assisting in labeling lane lines. The target vehicle may acquire the target image corresponding to the target lane through the one or more sensors, and send the target image to the electronic device, so that the electronic device acquires the target image corresponding to the target lane. For example, the one or more sensors may include vision sensors for acquiring the target image of the target lane. Wherein, the one or more sensors can be placed in a front, a rear and/or a roof of the target vehicle, and the one or more sensors in the target vehicle can be placed in a same position or in different positions, which is not limited in present disclosure. The one or more sensors can collect environmental images in a preset range around the target vehicle in real time or collect the environmental images in the preset range according to a preset period, so as to obtain the target image of the target lane. An image of a scene in front of the target vehicle can be captured by the one or more sensors, an image of the scene in front of the target vehicle can be referred to as a front view, such that the target image corresponding to the target lane can be obtained.

In some embodiments of the present disclosure, the electronic device may use a photographing device installed near the target lane to acquire the target image corresponding to the target lane. The photographing device may be a camera, a video camera, a monitoring device, or other devices with a photographing function. The camera device can be installed at a fixed position beside the target lane. The electronic device communicates with the photographing device to obtain the target image corresponding to the target lane.

S102, the electronic device obtains motion trajectory points of the target vehicle driving on the target lane.

Figure 3:
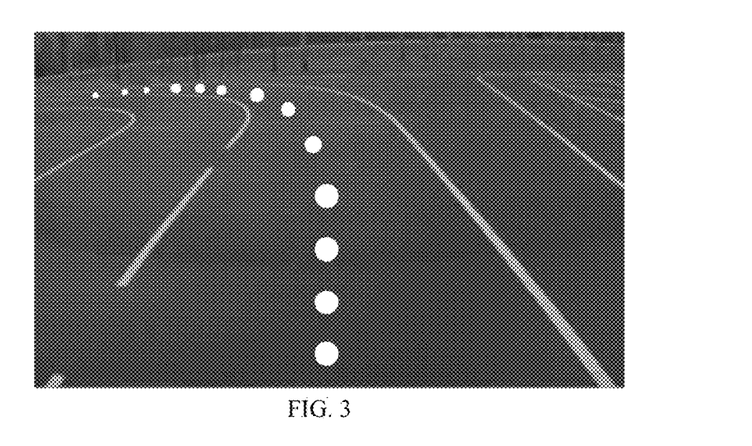
FIG. 3 is a schematic diagram of a scenario of motion trajectory points provided by an embodiment of the present disclosure.

The electronic device may acquire the motion trajectory points of the target vehicle driving on the target lane based on a motion trajectory obtained from the target vehicle. The motion trajectory includes a plurality of continuous motion trajectory points. The plurality of continuous motion trajectory points can be determined to be the motion trajectory points of the target vehicle. FIG. 3 is a schematic diagram of a scene of a motion trajectory including a plurality of motion trajectory points provided by an embodiment of the present disclosure. As shown in FIG. 3, a plurality of motion trajectory points is included in a motion trajectory. The motion trajectory shown in FIG. 3 also includes a plurality of motion trajectory points which is not shown in FIG. 3, for example, a plurality of motion trajectory points that is not illustrated may be included between two motion trajectory points that have been shown in FIG. 3. By decomposing the motion trajectory, the plurality of motion trajectory points can be obtained.

Figure 4:
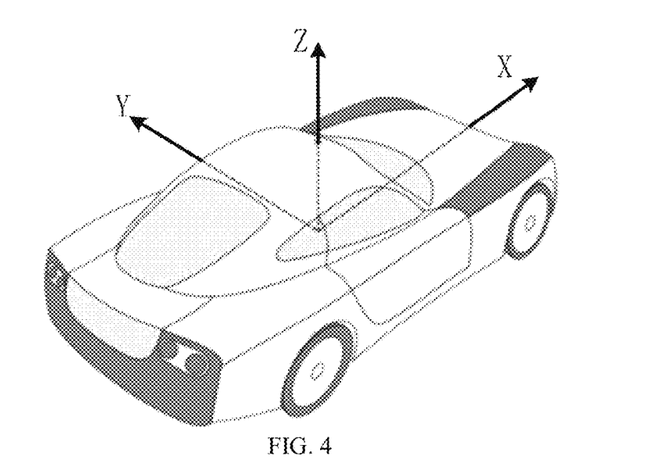
FIG. 4 is a schematic diagram of a scenario of a coordinate system of a vehicle provided by an embodiment of the present disclosure.

In some embodiments of the present disclosure, the motion trajectory of the target vehicle driving on the target lane can be determined based on a Global Navigation Satellite System (GNSS) and an inertial measurement unit (IMU) installed on the target vehicle, such that the motion trajectory points of the target vehicle can be obtained from the motion trajectory. The inertial measurement unit can be used to measure a three-axis attitude angle (or an angular rate) and an acceleration of a device such as the target vehicle. The inertial measurement unit may include a plurality of accelerometers and a plurality of gyroscopes. For example, the plurality of accelerometers includes three single-axis accelerometers, the plurality of gyroscopes includes three single-axis gyroscopes. Among them, each of the three single-axis accelerometers is used to detect a signal of an acceleration of the target vehicle in one of three axes of a vehicle coordinate system of the target vehicle, such that the acceleration of the target vehicle in the three axes can be obtained. The vehicle coordinate system is a coordinate system established based on the target vehicle. The three single-axis gyroscopes are used to detect angular velocity signals of the target vehicle relative to a navigation coordinate system, and can obtain an angular velocity and an acceleration of the target vehicle in a three-dimensional space, such that an attitude of the target vehicle can be obtained based on the angular velocity and acceleration of the target vehicle. The navigation coordinate system may be a world coordinate system. The motion trajectory points of the target vehicle are represented by coordinates in the world coordinate system. FIG. 4 is a schematic diagram of a scene of the vehicle coordinate system of the target vehicle provided by an embodiment of the present disclosure. As shown in FIG. 4, the vehicle coordinate system is a right-handed Cartesian coordinate system, with a center of the vehicle-mounted high-precision 3D ADR (3-Dimensional Automotive Dead Reckoning) as an origin, a front direction of the target vehicle as a positive direction of an x-axis, and a left side of the target vehicle as a positive direction of a y-axis. Length is in meters. Specifically, both the world coordinate system and the vehicle coordinate system are right-handed Cartesian coordinate systems, and a transformation between the two right-hand Cartesian coordinate systems can be determined through a rotation and translation matrix.

In some embodiments of the present disclosure, the motion trajectory points of the motion trajectory that is obtained based on the global navigation satellite system and the inertial measurement unit of the target vehicle may be directly determined as the motion trajectory points of the target vehicle driving on the target lane.

However, since the inertial measurement unit is installed inside the target vehicle and does not directly fit the target lane, the motion trajectory points of the motion trajectory that is obtained based on the global navigation satellite system and the inertial measurement unit are not actual trajectory points of the target vehicle driving on the target lane, the motion trajectory points of the motion trajectory that is obtained based on the global navigation satellite system and the inertial measurement unit actually are motion trajectory points corresponding to a plane having a certain distance from the target lane. Accordingly, there is an error between actual pixel coordinates and projected pixel coordinates calculated based on the motion trajectory points corresponding to the plane at block S103, and accordingly inaccurate labeling of the target lane line may be resulted. In order to avoid a situation that an installation position of the inertial measurement unit leads to the inaccurate labeling of the target lane line, in some embodiments of the present disclosure, a determining of the motion trajectory points of the target vehicle driving on the target lane based on the GNSS and the IMU installed on the target vehicle includes:

Obtaining trajectory points (hereinafter referred as "measured trajectory points") of the target vehicle measured via the GNSS and the IMU of the target vehicle;

Acquiring position information of the IMU on the target vehicle;

Determining the motion trajectory points of the target vehicle according to the measured trajectory points and the position information.

The measured trajectory points are motion trajectory points obtained based on the GNSS and the IMU of the target vehicle. The position information is information of the IMU relative to the target lane, and may be expressed in the world coordinate system. The electronic device may subtract the position information from the measured trajectory points to obtain the motion trajectory points of the target vehicle. For example, a measured trajectory point of the target vehicle is (40, 50, 25), the position information is (0, 0, 5), and the motion trajectory point corresponding to the measured trajectory point is determined to be (40, 50, 20).

S103, the electronic device calculates projected pixel coordinates of the motion trajectory points on the target image.

Figure 5:
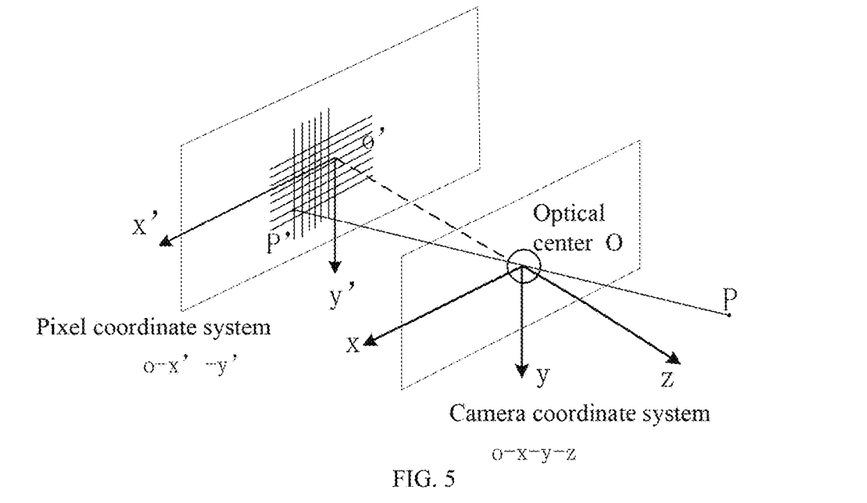
FIG. 5 is a schematic diagram of a scenario of a camera coordinate system and a pixel coordinate system provided by an embodiment of the present disclosure.

The motion trajectory points are coordinates in the world coordinate system, expressed in the form of three-dimensional coordinates. The electronic device calculates the projected pixel coordinates of the motion trajectory points on the target image by converting the motion trajectory points from the three-dimensional coordinates to two-dimensional coordinates. For example, the projected pixel coordinates of the motion trajectory points on the target image can be obtained by first converting the motion trajectory points from the world coordinate system to a camera coordinate system, and then converting from the camera coordinate system to a pixel coordinate system. FIG. 5 is a schematic diagram of a scene of the camera coordinate system and the pixel coordinate system provided by an embodiment of the present disclosure. As shown in FIG. 5, the camera coordinate system o-x-y is a three-dimensional coordinate, and the pixel coordinate system o'-x'-y' is a two-dimensional coordinate.

In some embodiments of the present disclosure, the calculating of the projected pixel coordinates of the motion trajectory points on the target image may include:

Determining a first transformation matrix between the world coordinate system and the camera coordinate system and determining a second transformation matrix between the camera coordinate system and the pixel coordinate system;

Determining projected camera coordinates based on the motion trajectory points and the first transformation matrix;

Determining the projected pixel coordinates based on the projected camera coordinates and the second transformation matrix.

The first transformation matrix is a transformation matrix for transforming the motion trajectory points from the world coordinate system to the camera coordinate system. The second transformation matrix is a projection matrix between the camera coordinate system and the pixel coordinate system, and is used to realize a transformation between the camera coordinate system and the pixel coordinate system. According to the first transformation matrix, the motion trajectory points based on the world coordinate system is converted to the camera coordinate system, and trajectory information of the motion trajectory points projected on the camera coordinate system is obtained; and according to the second transformation matrix, the trajectory information of the motion trajectory points projected on the camera coordinate system is converted to the pixel coordinate system, and trajectory information of the motion trajectory points on the pixel coordinate system is obtained, i.e., the projected pixel coordinates are obtained.

In some embodiments of the present disclosure, the conversion between the world coordinate system, the camera coordinate system and the pixel coordinate system can be completed by using camera intrinsic parameters and camera extrinsic parameters of the photographing device that captures the target image. A principle of camera imaging is pinhole imaging. The camera intrinsic parameters refers to a focal length of a convex lens of the photographing device and coordinates of an optical center in the pixel coordinate system. The camera extrinsic parameter refers to the rotation and translation matrix between the camera coordinate system and the vehicle coordinate system. The camera coordinate system is a right-handed Cartesian coordinate system with the optical center of the photographing device as the origin, an above direction and a front direction of the photographing device are respectively as the positive direction of the y-axis and the positive direction of z-axis. After the camera intrinsic parameters and camera extrinsic parameters of the photographing device have been pre-calibrated according to manual calibration data, the motion trajectory points can first be rotated and translated to the camera coordinate system according to the camera extrinsic parameters, and then according to a zoom principle of pinhole imaging and the camera intrinsic parameters, the motion trajectory points based on the camera coordinate system are projected to the pixel coordinate system, such that the projected pixel coordinates of the motion trajectory points on the target image are obtained.

In some embodiments of the present disclosure, the electronic device can determine a target lane line on the target lane by detecting lane lines on the target image using a convolutional neural network (CNN).

In some embodiments of the present disclosure, the electronic device can recognize the target lane line on the target lane based on visual assistance.

For example, the photographing device installed on a carrier can capture an image of a ground area around the carrier, the electronic device can perform preprocess such as screening, image stitching, dimming, and color matching on the captured image, and preliminarily identify the target lane line on the target lane by setting a threshold according to image features of texture, grayscale, and contrast of a lane line. The target lane line can be the lane line to be labeled. The target lane line may include all lane lines on a road on which the target vehicle drives, or the target lane line include two lane lines forming the target lane, that is, the two lane lines on the left and right sides of the target vehicle.

In order to avoid a recognition result of the lane line preliminary recognized from being easily affected by external factors such as lighting, occlusion, and lane line interruption, in some embodiments of the present disclosure, the recognizing of the target lane line on the target lane based on visual assistance includes:

Identifying lane lines from the target image using a difference between a lane line and image features of a surrounding road condition based on the visual assistance, and obtaining identified lane lines;

Obtaining the target lane line on the target lane by restoring the identified lane lines based on a lane line model.

The lane line model can be established according to structural features of the lane lines, and a large amount of lane line data can be obtained, and the lane line model can be obtained by training a neural network using the large amount of lane line data, and model parameters corresponding to the lane line model can be obtained.

The restoring of the identified lane lines may include area culling processing and area filling processing. The area culling process is used for excluding non-lane line areas in the identified lane lines. The area filling process is used to fill in areas where lane lines are missing in the identified lane lines. In some embodiments of the present disclosure, the lane line model may be a straight line model, a hyperbolic model, a spline lane line model, or a combination thereof.

S104, the electronic device determines target pixel coordinates corresponding to target lane lines on the target lane based on the projected pixel coordinates.

Based on the projected pixel coordinates of the motion trajectory points in the target image, the projected pixel coordinates of the target lane lines can be determined (the projected pixel coordinates of the target lane lines hereinafter referred to as "target pixel coordinates corresponding to target lane lines").

Figure 6:
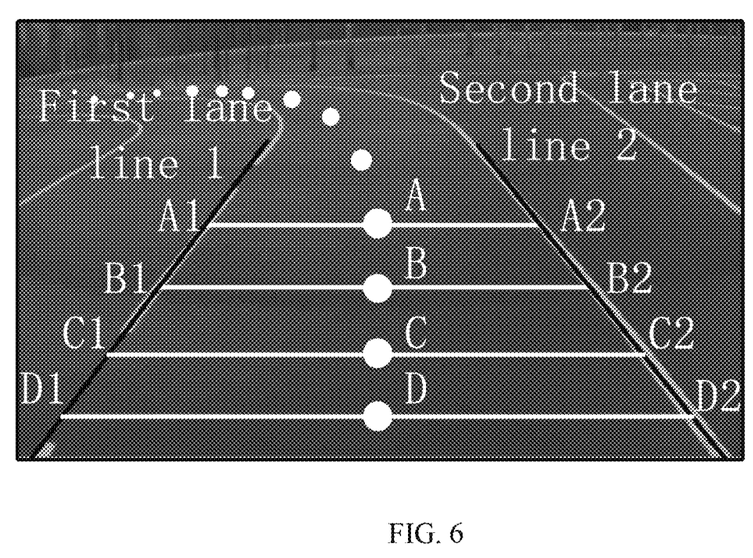
FIG. 6 is a schematic diagram of determining lane line coordinates based on projected pixel coordinates provided by an embodiment of the present disclosure.

FIG. 6 is a schematic diagram of determining lane line coordinates based on projected pixel coordinates provided by an embodiment of the present disclosure. As shown in FIG. 6, target pixel coordinates A1 of a first lane line 1 and target pixel coordinates A2 of a second lane line 2 can be determined based on the projected pixel coordinates of a motion trajectory point A; target pixel coordinates B1 of the first lane line 1 and target pixel coordinates B2 of the second lane line 2 can be determined based on the projected pixel coordinates of a motion trajectory point B: target pixel coordinates C1 of the first lane line 1 and target pixel coordinates C2 of the second lane line 2 can be determined based on the projected pixel coordinates of a motion trajectory point C: target pixel coordinates D1 of the first lane line 1 and target pixel coordinates D2 of the second lane line 2 can be determined based on the projected pixel coordinates of a motion trajectory point D. In some embodiments, the target pixel coordinates of other points on the lane line can also be obtained according to the projected pixel coordinates of the motion trajectory point A. For example, the target pixel coordinates of B1, B2, C1, C2, D1 and D2 can be obtained according to the projected pixel coordinates of the motion trajectory point A.

S105, the electronic device calculates camera coordinates (hereinafter "target camera coordinates") corresponding to the target pixel coordinates.

The target camera coordinates are converted from two-dimensional coordinates to three-dimensional coordinates, and are converted from the pixel coordinate system to the camera coordinate system, so as to realize the three-dimensional labeling of the target lane lines. The target pixel coordinates can be restored to the camera coordinates in the camera coordinate system based on the camera intrinsic parameters, and obtain the target camera coordinates. The target camera coordinates are the coordinates of the lane line in the camera coordinate system, and are used to label the target lane lines in three dimensions.

In some embodiments of the present disclosure, the calculating of the target camera coordinates corresponding to the target pixel coordinates includes: determining the target camera coordinates corresponding to the target pixel coordinates based on the second transformation matrix.

S106, the electronic device labels the target lane lines according to the target camera coordinates.

The lane line labeling method provided in the above embodiment obtains the motion trajectory points of the target vehicle driving on the target lane, and determines the projected pixel coordinates of the motion trajectory points on the target image corresponding to the target lane; thus the target pixel coordinates and target camera coordinates corresponding to the target lane lines on the target lane can be determined based on the projected pixel coordinates; finally, the target lane lines are labeled according to the target camera coordinates, and realizing automatic lane line alignment carry out three-dimensional labeling without manual labeling, which improves the efficiency of labeling lane lines.

Figure 7:
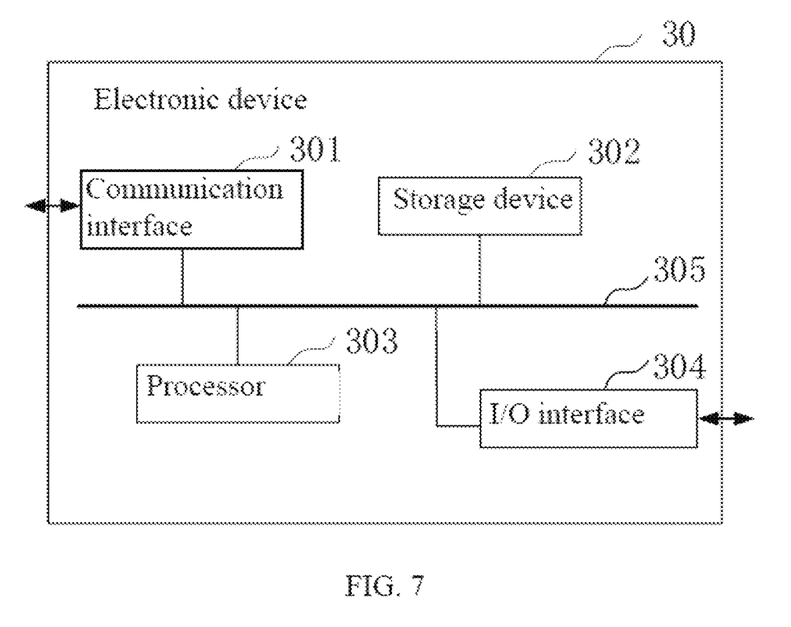
FIG. 7 is a schematic block diagram of a structure of an electronic device provided by an embodiment of the present disclosure.

Please refer to FIG. 7, FIG. 7 is a schematic structural block diagram of an electronic device provided by an embodiment of the present disclosure. The electronic device 30 may be a server or a terminal device.

The network where the electronic device 30 is located includes, but is not limited to, the Internet, a wide area network, a metropolitan area network, a local area network, a virtual private network (VPN) and the like.

As shown in FIG. 5, the electronic device 30 includes a communication interface 301, a storage device 302, at least one processor 303, an input/output (input/Output, I/O) interface 304 and a bus 305. The at least one processor 303 is respectively coupled to the communication interface 301, the storage device 302 and the I/O interface 304 through the bus 305.

The communication interface 301 is used for communication. The communication interface 301 may be an existing interface on the electronic device 30, or may be a new interface on the electronic device 30. The communication interface 301 may be a network interface, such as a wireless local area network (WLAN) interface, a cellular network communication interface, or a combination thereof.

The storage device 302 can be used to store an operating system and computer programs. For example, the storage device 302 stores programs corresponding to the above-mentioned lane marking method.

In one embodiment, the storage device 302 may include a program storage area and a data storage area. Among them, the program storage area can be used to store the operating system, at least one application program required by the method (such as the lane line labelling method, etc.); the data storage area can store data created according to the use of the electronic device 30, etc. In addition, the storage device 302 may include a volatile memory, and may also include a non-volatile memory, such as a hard disk, internal memory, plug-in hard disk, smart memory card (SMC), secure digital (SD) card, a flash memory card (Flash Card), at least one magnetic disk storage device, flash memory device, or other storage devices.

The at least one processor 303 provides calculation and control capabilities and supports the operation of the electronic device. For example, the at least one processor 303 is configured to execute the computer program stored in the storage device 302, so as to realize the blocks in the above-mentioned lane line labelling method.

The at least one processor 303 is a central processing unit (CPU), and the at least one processor 303 may also be other general-purpose processors, digital signal processors (DSP), application specific integrated circuits (ASIC), Field-Programmable Gate Array (FPGA) or other programmable logic devices, discrete gate or transistor logic devices, discrete hardware components, etc. Wherein, the general-purpose processor may be a micro-processor or the processor may be any conventional processor or the like.

The I/O interface 304 is used to provide a channel for user input or output. For example, the I/O interface 304 can be used to connect various input and output devices (mouse, keyboard, or 3D touch device, etc.), a display, so that the user can input information, or Make information visible.

The bus 305 is at least used to provide communication channels among the communication interface 301, the storage device 302, the at least one processor 303 and the I/O interface 304 in the electronic device 30.

Those skilled in the art can understand that the structure shown in FIG. 7 is only a block diagram of a partial structure related to the disclosed solution, and does not constitute a limitation on the electronic device to which the disclosed solution is applied. The specific electronic device may include more or fewer components than shown in the figures, or certain components may be combined, or have different component arrangements.

Wherein, in one embodiment, when the at least one processor 303 executes the computer program stored in the storage device 302 to realize the lane line labelling method, the following blocks are implemented:

Obtaining the target image corresponding to the target lane;

Acquiring the motion trajectory points of the target vehicle driving on the target lane;

Calculating projected pixel coordinates of the motion trajectory points on the target image;

Based on the projected pixel coordinates, determining target pixel coordinates corresponding to target lane lines on the target lane;

Calculating target camera coordinates corresponding to the target pixel coordinates;

Labelling the target lane lines according to the target camera coordinates.

Specifically, for the specific implementation method of the above instructions by the at least one processor 303, reference may be made to the description of relevant blocks in the aforementioned embodiment of the lane line labelling method, and details are not repeated here.

The embodiments of the present disclosure also provide a computer-readable storage medium, where a computer program is stored in the computer-readable storage medium, the computer program includes program instructions, and the method implemented when the program instructions are executed can refer to those various embodiments of the lane line labelling method are disclosed.

Wherein, the computer-readable storage medium may be an internal storage unit of the electronic device described in the foregoing embodiments, such as a hard disk or a memory of the electronic device. The computer-readable storage medium can also be an external storage device of the electronic device, such as a plug-in hard disk equipped on the electronic device, a smart memory card (SMC), a secure digital (SD) card, flash memory card (Flash Card), etc.

Further, the computer-readable storage medium may mainly include a program storage area and a data storage area, wherein the program storage area may store an operating system, an application program required by at least one function, etc.; the data storage area may store data and the like created according to use of the electronic device.

The electronic device and the computer-readable storage medium provided in the foregoing embodiments obtain the target image corresponding to the target lane; acquire the motion trajectory points of the target vehicle when the target vehicle driving on the target lane; calculate projected pixel coordinates of the motion trajectory points on the target image; based on the projected pixel coordinates, determine target pixel coordinates corresponding to target lane lines on the target lane; calculate target camera coordinates corresponding to the target pixel coordinates; and label the target lane lines according to the target camera coordinates, so that automatically label the lane lines in 3D without manual labelling is realized, which improves the efficiency of lane line labelling.

It should also be understood that the terminology used in the description of the present disclosure is for the purpose of describing particular embodiments only and is not intended to be limiting of the present disclosure. As used in this disclosure and the appended claims, the singular forms "a" "an" and "the" are intended to include plural referents unless the context clearly dictates otherwise.

It should also be understood that the term "and/or" used in the present disclosure and the appended claims refers to any and all possible combinations of one or more of the associated listed items and includes such combinations. As used herein, the term "comprises", "comprises" or any other variation thereof is intended to cover a non-exclusive inclusion such that a process, method, article or system comprising a set of elements includes not only those elements, but also includes other elements not expressly listed, or elements inherent in the process, method, article, or system. Without further limitations, an element defined by the phrase "comprising a . . . " does not preclude the presence of additional identical elements in the process, method, article or system comprising that element.

The serial numbers of the above-mentioned embodiments of the present disclosure are for description only, and do not represent the advantages and disadvantages of the embodiments. The above is only a specific implementation of the disclosure, but the protection scope of the disclosure is not limited thereto. Any person familiar with the technical field can easily think of various equivalent methods within the technical scope of the disclosure. Modifications or replacements, these modifications or replacements should be covered within the scope of protection of the present disclosure. Therefore, the protection scope of the present disclosure should be determined by the protection scope of the claims.

What is claimed is:

1. A lane line labeling method applied to an electronic device, the method comprising:
    acquiring a target image corresponding to a target lane;
    determining motion trajectory points of a target vehicle driving on the target lane based on a global navigation satellite system and an inertial measurement unit of the target vehicle;
    calculating projected pixel coordinates of the motion trajectory points on the target image;
    determining target pixel coordinates corresponding to target lane lines on the target lane based on the projected pixel coordinates;
    calculating target camera coordinates corresponding to the target pixel coordinates based on camera intrinsic parameters of a photographing device that captures the target image; and
    labelling the target lane lines according to the target camera coordinates.

2. The lane line labeling method according to claim 1, wherein the calculating of the projected pixel coordinates of the motion trajectory points on the target image comprises:
    determining a first transformation matrix between a world coordinate system and the camera coordinate system and determining the second transformation matrix between the camera coordinate system and the pixel coordinate system according to the camera intrinsic parameters and camera extrinsic parameters of the photographing device
    determining projected camera coordinates based on the motion trajectory points and the first transformation matrix; and
    determining the projected pixel coordinates based on the projected camera coordinates and the second transformation matrix.

3. The lane line labeling method according to claim 2, wherein the calculating of the target camera coordinates corresponding to the target pixel coordinates based on camera intrinsic parameters of the photographing device that captures the target image comprises:
    determining the target camera coordinates corresponding to the target pixel coordinates based on the second transformation matrix.

4. The lane line labeling method according to claim 1, wherein the determining of the motion trajectory points based on the global navigation satellite system and the inertial measurement unit of the target vehicle comprises:
    obtaining measured trajectory points of the target vehicle measured via the global navigation satellite system and the inertial measurement unit;
    acquiring position information of the inertial measurement unit on the target vehicle; and
    determining the motion trajectory points according to the measured trajectory points and the position information.

5. The lane line labeling method according to claim 1, further comprising:
    recognizing the target lane line on the target lane based on visual assistance.

6. The lane line labeling method according to claim 5, wherein the recognizing of the target lane line on the target lane based on visual assistance comprises:
    identifying lane lines from the target image using a difference between a lane line and image features of a surrounding road condition based on the visual assistance, and obtaining identified lane lines; and
    obtaining the target lane line on the target lane by restoring the identified lane lines based on a lane line model.

7. An electronic device comprising:
    a storage device;
    at least one processor; and
    the storage device storing one or more programs, which when executed by the at least one processor, cause the at least one processor to:
    acquire a target image corresponding to a target lane;
    determine motion trajectory points of a target vehicle driving on the target lane based on a global navigation satellite system and an inertial measurement unit of the target vehicle;
    calculate projected pixel coordinates of the motion trajectory points on the target image;
    determine target pixel coordinates corresponding to target lane lines on the target lane based on the projected pixel coordinates;
    calculate target camera coordinates corresponding to the target pixel coordinates based on camera intrinsic parameters of a photographing device that captures the target image; and
    label the target lane lines according to the target camera coordinates.

8. The electronic device according to claim 7, wherein the at least one processor calculates the projected pixel coordinates of the motion trajectory points on the target image by:
    determining a first transformation matrix between a world coordinate system and the camera coordinate system and determining the second transformation matrix between the camera coordinate system and the pixel coordinate system according to the camera intrinsic parameters and camera extrinsic parameters of the photographing device that captures the target image;

determining projected camera coordinates based on the motion trajectory points and the first transformation matrix; and determining the projected pixel coordinates based on the projected camera coordinates and the second transformation matrix.

9. The electronic device according to claim 8, wherein the at least one processor calculates the target camera coordinates corresponding to the target pixel coordinates based on camera intrinsic parameters of the photographing device that captures the target image by:

determining the target camera coordinates corresponding to the target pixel coordinates based on the second transformation matrix.

10. The electronic device according to claim 7, wherein the at least one processor determines the motion trajectory points based on the global navigation satellite system and the inertial measurement unit of the target vehicle by:

obtaining measured trajectory points of the target vehicle measured via the global navigation satellite system and the inertial measurement unit;

acquiring position information of the inertial measurement unit on the target vehicle; and determining the motion trajectory points according to the measured trajectory points and the position information.

11. The electronic device according to claim 7, wherein the at least one processor is further caused to:

recognize the target lane line on the target lane based on visual assistance.

12. The electronic device according to claim 11, wherein the at least one processor recognizes the target lane line on the target lane based on visual assistance by:

identifying lane lines from the target image using a difference between a lane line and image features of a surrounding road condition based on the visual assistance, and obtaining identified lane lines; and obtaining the target lane line on the target lane by restoring the identified lane lines based on a lane line model.

13. A non-transitory storage medium having instructions stored thereon, when the instructions are executed by a processor of an electronic device, the processor is caused to perform a lane line labeling method, wherein the method comprises:

acquiring a target image corresponding to a target lane;

determining motion trajectory points of a target vehicle driving on the target lane based on a global navigation satellite system and an inertial measurement unit of the target vehicle;

calculating projected pixel coordinates of the motion trajectory points on the target image;

determining target pixel coordinates corresponding to target lane lines on the target lane based on the projected pixel coordinates;

calculating target camera coordinates corresponding to the target pixel coordinates based on camera intrinsic parameters of a photographing device that captures the target image; and labelling the target lane lines according to the target camera coordinates.

14. The non-transitory storage medium according to claim 13, wherein the calculating of the projected pixel coordinates of the motion trajectory points on the target image comprises:

determining a first transformation matrix between a world coordinate system and the camera coordinate system and determining the second transformation matrix between the camera coordinate system and the pixel coordinate system according to camera intrinsic parameters and camera extrinsic parameters of the photographing device that captures the target image;

determining projected camera coordinates based on the motion trajectory points and the first transformation matrix; and determining the projected pixel coordinates based on the projected camera coordinates and the second transformation matrix.

15. The non-transitory storage medium according to claim 14, wherein the calculating of the target camera coordinates corresponding to the target pixel coordinates based on camera intrinsic parameters of the photographing device that captures the target image comprises:

determining the target camera coordinates corresponding to the target pixel coordinates based on the second transformation matrix.

16. The non-transitory storage medium according to claim 13, wherein the determining of the motion trajectory points based on the global navigation satellite system and the inertial measurement unit of the target vehicle comprises:

obtaining measured trajectory points of the target vehicle measured via the global navigation satellite system and the inertial measurement unit;

acquiring position information of the inertial measurement unit on the target vehicle; and determining the motion trajectory points according to the measured trajectory points and the position information.

17. The non-transitory storage medium according to claim 13, wherein the method further comprises:

identifying lane lines from the target image using a difference between a lane line and image features of a surrounding road condition based on the visual assistance, and obtaining identified lane lines; and obtaining the target lane line on the target lane by restoring the identified lane lines based on a lane line model.

* * * * *